US006723768B2

(12) United States Patent
Adams et al.

(10) Patent No.: US 6,723,768 B2
(45) Date of Patent: Apr. 20, 2004

(54) POLYESTER/POLYCARBONATE BLENDS WITH REDUCED YELLOWNESS

(75) Inventors: Valerie Sue Adams, Gray, TN (US); Emmett Dudley Crawford, Kingsport, TN (US); Michael Eugene Donelson, Gray, TN (US); Douglas Stephens McWilliams, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 28 days.

(21) Appl. No.: 10/107,674

(22) Filed: Mar. 27, 2002

(65) Prior Publication Data
US 2003/0187151 A1 Oct. 2, 2003

(51) Int. Cl.[7] .................. C08L 69/00; C08L 67/02; C08K 5/524
(52) U.S. Cl. .................. 524/108; 524/120; 525/439
(58) Field of Search ............... 524/108, 120; 525/439

(56) References Cited

U.S. PATENT DOCUMENTS

| | | | |
|---|---|---|---|
| 2,465,319 A | 3/1949 | Whinfield et al. | |
| 2,901,466 A | 8/1959 | Kibler et al. | |
| 2,991,273 A | 7/1961 | Hechelhammer et al. | |
| 2,999,835 A | 9/1961 | Goldberg | |
| 2,999,846 A | 9/1961 | Schnell et al. | |
| 3,028,365 A | 4/1962 | Schnell et al. | |
| 3,047,539 A | 7/1962 | Pengilly | |
| 3,148,172 A | 9/1964 | Fox | |
| 3,153,008 A | 10/1964 | Fox | |
| 3,271,367 A | 9/1966 | Schnell et al. | |
| 3,772,405 A | 11/1973 | Hamb | |
| 3,953,539 A | 4/1976 | Kawase et al. | |
| 4,088,709 A | 5/1978 | Seymour et al. | |
| 4,123,436 A | 10/1978 | Holub et al. | |
| 4,188,314 A | 2/1980 | Fox et al. | |
| 4,391,954 A | 7/1983 | Scott | |
| 4,521,556 A | 6/1985 | Adams | |
| 4,740,581 A | 4/1988 | Pruett et al. | |
| 4,749,772 A | 6/1988 | Weaver et al. | |
| 4,749,773 A | 6/1988 | Weaver et al. | |
| 4,749,774 A | 6/1988 | Weaver et al. | |
| 4,786,692 A | 11/1988 | Allen et al. | |
| 4,950,732 A | 8/1990 | Weaver et al. | |
| 4,981,898 A | 1/1991 | Bassett | |
| 4,982,014 A | 1/1991 | Freitag et al. | |
| 5,010,162 A | 4/1991 | Serini et al. | |
| 5,106,944 A | * 4/1992 | Sublett | |
| 5,239,020 A | 8/1993 | Morris | |
| 5,252,699 A | 10/1993 | Chamberlin et al. | |
| 5,254,610 A | 10/1993 | Small, Jr. et al. | |
| 5,340,910 A | 8/1994 | Chamberlin et al. | |
| 5,354,791 A | 10/1994 | Gallucci | |
| 5,372,864 A | 12/1994 | Weaver et al. | |
| 5,384,377 A | 1/1995 | Weaver et al. | |
| 5,399,595 A | 3/1995 | Sublett et al. | |
| 5,453,479 A | 9/1995 | Borman et al. | |
| 5,478,896 A | 12/1995 | Scott | |
| 5,482,977 A | 1/1996 | McConnell et al. | |
| 5,491,179 A | 2/1996 | Mason | |
| 5,502,119 A | 3/1996 | Hamilton | |
| 5,654,347 A | 8/1997 | Khemani et al. | |
| 5,681,918 A | 10/1997 | Adams et al. | |
| 5,886,133 A | 3/1999 | Hilbert et al. | |
| 5,922,816 A | * 7/1999 | Hamilton | |
| 6,221,556 B1 | 4/2001 | Gallucci et al. | |
| 6,323,291 B1 | 11/2001 | Mason et al. | |

FOREIGN PATENT DOCUMENTS

| | | |
|---|---|---|
| EP | 0634435 A1 | 1/1995 |
| EP | 1065230 A2 | 8/1995 |
| GB | 1599230 | 1/1980 |
| WO | WO 96/19520 A1 | 6/1996 |
| WO | WO 00/71252 A1 | 5/2002 |

OTHER PUBLICATIONS

Smith "Chemistry of Miscible PC–Copolyester Bleads" *Journal of Applied Polymer Sci* Vol 26 pp. 4233–4245.*
J. Appl. Polym. Sci., 23, 575 (1979).

* cited by examiner

Primary Examiner—David J. Buttner
(74) Attorney, Agent, or Firm—B. J. Boshears; Bernie Graves

(57) ABSTRACT

Thermoplastic compositions of polyester/polycarbonate blends have reduced yellowness and improved thermal and melt stability when the polyester is produced with a reduced level of a titanium-containing catalyst in an amount of from about 1 to about 30 ppm elemental titanium, with ppm based on the total weight of the polyester.

6 Claims, No Drawings

POLYESTER/POLYCARBONATE BLENDS WITH REDUCED YELLOWNESS

FIELD OF THE INVENTION

The present invention relates to polyester/polycarbonate blends and more particularly, to such blends with reduced yellowness and with increased thermal and melt stability resulting from the catalyst utilized in the production of the polyester.

BACKGROUND OF THE INVENTION

Thermoplastic compositions and articles made from polyester/polycarbonate blends are known. For example, Research Disclosure 22921, May 1983, discloses blends of polycarbonate with polyesters based on terephthalic acid and a mixture of 1,4-cyclohexanedimethanol and ethylene glycol. Similar blends are disclosed in U.S. Pat. Nos. 4,786,692 and 5,478,896. Blends of polycarbonate with another family of polyesters, those based on a mixture of terephthalic and isophthalic acids with 1,4-cyclohexanedimethanol, are disclosed in U.S. Pat. Nos. 4,188,314 and 4,391,954. British Patent Specification 1,599,230 (published Jan. 16, 1980) discloses blends of polycarbonate with polyesters of 1,4-cyclohexanedimethanol and hexacarbocyclic dicarboxylic acid. Mohn et al. reported on thermal properties of blends of polyesters based on 1,4-cyclohexanedimethanol and terephthalic acid or terephthalic/isophthalic acid mixtures with polycarbonate [J. Appl. Polym. Sci., 23, 575 (1979)], concluding that there were only slight differences in behavior between the two systems. U.S. Pat. No. 6,323,291 describes blends of polycarbonate with a melt flow index greater than 18 g/10 min and polyesters derived from phthalic acid and a diol portion of 1,4-cyclohexanedimethanol and ethylene glycol. For the synthesis of polyesters used in the blends, each of the patents above refers solely to U.S. Pat. No. 2,901,466, which teaches the use of ester interchange catalysts in the production of polyesters but does not specify a particular catalyst type or catalyst level. Fifty-four of the polyester examples in the '466 patent show the use of titanium based catalysts. The titanium concentration in these examples is uniformly greater than 35 parts per million (ppm) elemental titanium, typically in the range of 50 to 200 ppm.

U.S. Pat. No. 6,221,556 discloses an article for optical storage from blends containing polycarbonate and polyesters based on a cycloaliphatic diacid and a cycloaliphatic diol. The '556 patent teaches that the polyester is generally produced with a titanium based catalyst system, in a suitable amount, typically 50 to 200 ppm of titanium based upon the final product and refers to U.S. Pat. Nos. 2,465,319 and 3,047,539 for synthesis of polyesters. The '319 patent discloses the production of polyesters with alkali catalyst metals and the '539 patent discloses the production of polyesters using antimony catalyst system, with neither specifying a particular catalyst level.

Interactions occur during melt blending of polyesters and polycarbonates. These interactions may result in changes in melt viscosity, crystallinity, color, and the production of gaseous by-products. In particular, a yellowish color occurs during the melt blending of a colorless polycarbonate and a colorless polyester. These unfavorable interactions are generally controlled through the use of stabilization additives, typically phosphorus based compounds. U.S. Pat. Nos. 4,188,314; 4,391,954; 4,786,692, 5,478,896; 6,221,556 and 6,323,291 teach the use of stabilizers. U.S. Pat. No. 4,786,692 states that blend compositions may contain stabilizers, such as phosphites, phosphates, epoxides, or combination thereof. The use of phosphorus based stabilizers in polyester/polycarbonate blends are additionally disclosed in U.S. Pat. Nos. 3,953,539 and 4,088,709. U.S. Pat. No. 4,981,898 discloses improved polyester/polycarbonate blends stabilized with a metaphosphate fiber. U.S. Pat. No. 5,254,610 discloses improved polyester/polycarbonate blends with combinations of aliphatic and aromatic phosphite compounds. U.S. Pat. No. 5,491,179 claims improved polyester/polycarbonate blends through the addition of specified cyclic ether based phosphites. U.S. Pat. No. 5,502,119 discloses improved polyester/polycarbonate blends stabilized with an organosilicate. U.S. Pat. No. 5,922,816 discloses improved polyester/polycarbonate blends stabilized with a silyl phosphate. U.S. Pat. No. 6,221,556 teaches that blends must contain an effective amount of stabilizer, typically phosphorus based, to prevent color formation resulting in a yellowness index (YI) less than or equal to 5 YI units. However, as discussed in U.S. Pat. No. 5,354,791, high stabilizer concentrations are known to have detrimental effects on the performance of polyester/polycarbonate blends. Thus, reducing the level of stabilization needed for polyester/polycarbonate blends would be advantageous.

While changes in polyester catalyst type and levels for improvements in the neat polyester are noted widely in prior art, for example U.S. Pat. No. 5,886,133, there are few references to the benefits of catalyst type and levels on the properties of subsequent polyester/polycarbonate blends. U.S. Pat. No. 5,239,020 discloses improved polyester/polycarbonate blends, having a Gardner b value less than 6, without the addition of a stabilizer by use of a tin based ester interchange catalyst. The '020 patent teaches that blends of polyesters made with a titanium based catalyst and polycarbonate without a stabilizer typically results in the formation of a yellowish color, having a Gardner b color value generally greater than 20. The polyesters for blending with polycarbonate claimed in the '020 patent are derived from an acid portion of terephthalic and isophthalic acids and a diol portion of aliphatic diols containing 3 to 20 carbons. Interactions between tin based catalysts and ethylene glycol results in color formation in the neat polyester and subsequently blends with polycarbonate, hence the omission of diols with 2 carbons. U.S. Pat. No. 5,453,479 discloses improved polyester/polycarbonate blends relative to increased strength and reduced processing times by the use of a polyester esterification catalyst containing phosphorus and titanium compounds. The catalyst is added prior to polycondensation during esterification of the diacid and diol in the preparation of the polyester. The titanium catalyst is in an amount typical of the prior art of greater than 50 ppm elemental titanium.

Thus, there exists a need in the art for polyester/polycarbonate blends that have reduced yellowness either without the need for stabilization or with a reduced level of stabilization. Accordingly, it is to the provision of such that the present invention is directed.

SUMMARY OF THE INVENTION

Thermoplastic compositions of polyester/polycarbonate blends have reduced yellowness and improved thermal and melt stability. Such unexpected improvements are achieved by preparing the blends utilizing polyesters that have been produced with a reduced level of titanium catalyst. Depending on end use color requirements, the polyester/polycarbonate blends of the present invention can be used in the absence of a conventional stabilizing compound, thereby eliminating the step and cost of incorporating the stabilizing compound. In addition, further reductions in the b* yellow color of such blends, depending on end use requirements, can be achieved by the addition of stabilizing compounds at much lower concentrations than previously used. The low titanium level polyester/polycarbonate blends have reduced yellowness, and if needed require lower levels of stabilization to reduce b* color, compared to equivalent high titanium level polyester/polycarbonate blends of the prior art.

More specifically, in a thermoplastic composition comprising a compounded blend of a polyester and a polycarbonate, the improvement comprises preparing the polyester in the presence of a titanium-containing catalyst compound in an amount of from about 1 to about 30 ppm elemental titanium, with ppm based on the total weight of the polyester. Optionally, an ester exchange catalyst in an amount of from about 1 to about 150 ppm of an active element is utilized when the acid component is derived from a diester of the dicarboxylic acid.

Alternatively, in a thermoplastic composition comprising a polymer mixture of from about 1 to about 99 weight percent of a polyester and from about 99 to about 1 weight percent of a polycarbonate, the improvement comprises the polyester comprising catalyst residues of (i) a titanium-containing catalyst compound in an amount of from about 1 to about 30 ppm elemental titanium, (ii) a pre-polycondensation phosphorus-containing compound in an amount of from about 1 to about 150 ppm elemental phosphorus and (iii) optionally, an ester exchange catalyst in an amount of from about 1 to about 150 ppm of an active element utilized when the acid component is derived from a diester of the dicarboxylic acid, with ppm based on the total weight of the polyester.

In another embodiment, a thermoplastic composition comprises a miscible blend of:
(a) about 1 to about 99 weight percent of a polyester comprising:
  (i) an acid component comprising repeat units from about 80 to 100 mole percent terephthalic acid, isophthalic acid, naphthalenedicarboxylic acid, 1,4-cyclohexanedicarboxylic acid or mixtures thereof and from 0 to about 20 mole percent of other dicarboxylic acid units having from about 4 to about 40 carbon atoms, wherein the total mole percent of the acid component is equal to 100 mole percent, and
  (ii) a diol component comprising repeat units from about 40 to 100 mole percent 1,4-cyclohexanedimethanol, from 0 to about 60 mole percent ethylene glycol, and from 0 to about 20 mole percent of other diol units having from 3 to about 12 carbon atoms, wherein the total mole percent of diol component is equal to 100 mole percent; and
(b) about 99 to about 1 weight percent of a polycarbonate of 4,4-isopropylidenediphenol;
with the improvement comprising the polyester comprising catalyst residues of (i) a titanium-containing catalyst compound in an amount of from about 1 to about 20 ppm elemental titanium, (ii) a pre-polycondensation phosphorus-containing compound in an amount of from about 1 to about 150 ppm elemental phosphorus, (iii) from about 1 to about 10 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isoquinoline-2,7-done) compound, wherein the compounds contain at least one polyester reactive group; and (iv) optionally, an ester exchange catalyst in an amount of from about 1 to about 150 ppm of an active element utilized when the acid component is derived from a diester of the dicarboxylic acid, with ppm based on the total weight of the polyester.

In still another embodiment, a thermoplastic composition comprises a miscible blend of from about 1 to about 99 weight percent of a polyester comprising an acid component comprising repeat units from terephthalic acid, isophthalic acid, and mixtures thereof and a diol component comprising repeat units from about 40 to 100 mole percent 1,4-cyclohexanedimethanol and about 0 to about 60 mole percent ethylene glycol, based on 100 mole percent acid component and 100 mole percent diol component, and from about 99 to about 1 weight percent of a polycarbonate of 4,4-isopropylidenediphenol. The improvement comprises:
(1) preparing the polyester in the presence of a catalyst consisting essentially of (i) a titanium-containing catalyst compound in an amount of about 1 to about 15 ppm elemental titanium, (ii) a pre-polycondensation phosphorus-containing compound in an amount of about 45 to about 100 ppm elemental phosphorus, (iii) from about 1 to about 5 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isoquinoline-2,7-done) compound, wherein the compounds contain at least one polyester reactive group, and (iv) optionally, an ester exchange catalyst in an amount of from about 10 to about 65 ppm of an active element utilized when the acid component is derived from a diester of the dicarboxylic acid, with ppm based on the total weight of the polyester; and
(2) the miscible blend comprising from about 0.05 to about 0.15 weight percent of a post-polycondensation phosphorus-containing compound selected from the group consisting of an aliphatic phosphite compound, aromatic phosphite compound or a mixture thereof, based on the total weight percent of the blend.

In still another embodiment, a process for preparing a blend of a polyester and a polycarbonate comprises the steps of:
(a) producing a polyester comprising the steps of:
  (i) reacting 100 mole percent of a diacid, or ester derivative thereof, of at least one aromatic, aliphatic, or alicyclic dicarboxylic acid, wherein the aromatic portion of said aromatic dicarboxylic acid has 6–20 carbon atoms and wherein the aliphatic or alicyclic portion of said aliphatic or alicyclic dicarboxylic acid has 3–20 carbon atoms, and 100 mole percent of a diol comprising at least one aliphatic, aliphatic ether, or cycloaliphatic diol having 2–20 carbon atoms at a temperature and pressure sufficient to effect esterification for the diacid or ester exchange for the ester derivative; and
  (ii) polycondensing the product of step (i) at temperatures and pressures sufficient to effect polycondensation in the presence of a titanium-containing catalyst compound in an amount of from about 1 to about 30 ppm elemental titanium, with ppm based on the total weight of the polyester; and
(b) compounding from about 1 to about 99 weight percent of the polyester of step (a) with from about 99 to about 1 weight percent of a polycarbonate to form a blend, with the weight percent based on the total weight percent of the blend.

In still another embodiment, a process for preparing a thermoplastic composition comprises the step of compounding:

(a) from about 1 to about 99 weight percent of a polyester comprising:
  (i) an acid component comprising repeat units from about 80 to 100 mole percent terephthalic acid, isophthalic acid, and mixtures thereof, based on 100 mole percent acid component;
  (ii) a diol component comprising repeat units from about 40 to 100 mole percent 1,4-cyclohexanedimethanol and about 0 to about 60 mole percent ethylene glycol, based on 100 mole percent diol component; and
  (iii) residues of a titanium-containing catalyst compound in an amount of from about 1 to about 20 ppm elemental titanium, a pre-polycondensation phosphorus-containing compound in an amount of from about 1 to about 100 ppm elemental phosphorus, and optionally, an ester exchange catalyst in an amount of from about 1 to about 150 ppm of an active element utilized when the acid component is derived from a diester of the dicarboxylic acid, with ppm based on the total weight of the polyester. and (b) from about 99 to about 1 weight percent of a polycarbonate.

In still another embodiment of the present invention, a polyester composition comprises (a) an acid component comprising repeat units from terephthalic acid, isophthalic acid, and mixtures thereof;

(b) a diol component comprising repeat units from about 40 to 100 mole percent 1,4-cyclohexanedimethanol and about 0 to about 60 mole percent ethylene glycol; and (c) catalyst residues consisting essentially of (i) a titanium-containing catalyst compound in an amount of about 1 to about 15 ppm elemental titanium, (ii) a pre-polycondensation phosphorus-containing compound in an amount of about 45 to about 100 ppm elemental phosphorus, (iii) from about 1 to about 5 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isquinoline-2,7-done) compound, wherein the compounds contain at least one polyester reactive group, and (iv) optionally, an ester exchange catalyst in an amount of from about 10 to about 65 ppm of an active element utilized when the acid component is derived from a diester of the dicarboxylic acid;

wherein the acid component is based on 100 mole percent and the diol component is based on 100 mole percent and ppm are based on the total weight of the polyester. Preferably, the polyester comprises from about 95 to 100 mole percent of terephthalic acid, from about 58 to about 66 mole percent 1,4-cyclohexanedimethanol and from about 42 to about 34 mole percent of ethylene glycol. Also preferably, the polyester comprises 100 mole percent 1,4-cyclohexanedimethanol, from about 22 to about 30 mole percent isophthalic acid, and from about 78 to about 70 mole percent terephthalic acid.

DESCRIPTION OF THE INVENTION

The thermoplastic compositions of the present invention used to produce molded articles, films and sheets comprise a polymer mixture of a polyester and a polycarbonate. Due to changes in the catalyst for the polyester, a subsequent compounded blend of the polyester and polycarbonate has reduced yellowness (i.e. b* pellet color of about 6.0 to about −2.0), improved thermal stability and improved melt stability. These improvements are unexpectedly achieved in a compounded blend of a polyester and a polycarbonate, wherein the polyester has been prepared in the presence of a titanium-containing catalyst compound in an amount of from about 1 to about 30 ppm elemental titanium. Preferably, the amount of elemental titanium is from about 1 to about 20 ppm, and more preferably from about 1 to about 15 ppm, with ppm are based on the total weight of the polyester. Optionally, an ester exchange catalyst in an amount of from about 1 to about 150 ppm of an active element is utilized in preparing the polyester when an acid component of the polyester is derived from a diester of a dicarboxylic acid. This level of elemental titanium in the present invention is a lower level of titanium as compared to prior art polyester/polycarbonate blends, typically prepared using a polyester having 50 ppm or greater elemental titanium. As shown in the examples, the lowering of the titanium level from about 50 ppm to below about 20 ppm, results in slight to no improvements in the neat polyester with respect to yellowness, thermal stability, and melt stability. However, significant reductions in yellowness and improvements in thermal stability and melt stability unexpectedly occur upon forming polyester/polycarbonate blends using polyester produced with low levels (<30 ppm elemental Ti) of a titanium-containing catalyst compound compared to equivalent polyester/polycarbonate blends using polyesters prepared with higher conventional levels (>50 ppm elemental Ti) of the titanium-containing catalyst compound. In addition, the polyester/polycarbonate blends of this invention require less stabilization to obtain further reductions in color, if needed.

Preferably, the compounded blend further comprises a phosphorus-containing compound in an amount of from about 0.01 to about 500 ppm elemental phosphorus, with ppm based on the total weight of the compounded blend. The phosphorus-containing compound can be added during the preparation of the polyester prior to polycondensation, i.e. pre-polycondensation phosphorus. The pre-polycondensation phosphorus is present in an amount of from about 10 to about 100 ppm, with ppm based on the weight of the polyester. Also, the phosphorus-containing compound can be added during the preparation of the polyester after polycondensation or during the preparation of the polyester/polycarbonate blends, i.e. post-polycondensation phosphorus. The post-polycondensation phosphorus is present in an amount of from about 10 to about 350 ppm, preferably in an amount of from about 50 to about 150 ppm, with ppm based on the total weight of the compounded blend.

One embodiment of the present invention is a thermoplastic composition comprising a polymer mixture of from about 1 to about 99 weight percent of a polyester and from about 99 to about 1 weight percent of a polycarbonate. The improvement is in the particular polyester composition used in conjunction with the polycarbonate. The polyester comprises residues of (i) a titanium-containing catalyst compound in an amount of from about 1 to about 30 ppm elemental titanium and (ii) a pre-polycondensation phosphorus-containing compound in an amount of from about 1 to about 150 ppm elemental phosphorus. Optionally, (iii) an ester exchange catalyst in an amount of from about 1 to about 150 ppm of an active element is utilized when the acid component is derived from a diester of the dicarboxylic acid. All the above ppm are based on the total weight of the polyester.

In the polymer mixture, the polyester is preferably present in an amount ranging from about 10 to about 90 weight percent, more preferably from about 20 to about 80 weight percent. The polycarbonate is present in an amount ranging from about 90 to about 10 weight percent, preferably from about 80 to about 20 weight percent. The weight percents are based on the weight of the total thermoplastic composition or polymer mixture.

Polyester

Any polyester can be used in the present invention. Determining the particular polyester to use in the polymer mixture depends on whether a miscible or immiscible compounded blend is desired.

In accordance with the present invention, for all embodiments the polyester comprises as a catalyst a titanium-containing compound in an amount of from about 1 to about 30 ppm, preferably from about 1 to about 20 ppm, and more preferably from about 1 to about 15 ppm elemental titanium. The titanium-containing compound is useful as an esterification and/or polycondensation catalyst.

The titanium-containing compound is preferably an alkyl titanate. Exemplary compounds include: acetyl triisopropyl titanate, titanium tetraisopropoxide, titanium glycolates, titanium butoxide, hexyleneglycol titanate, tetraisooctyl titanate, titanium tetramethylate, titanium tetrabutylate, titanium tetra-isopropylate, titanium tetrapropylate, tetrabutyl titanate, and the like. A preferred alkyl titanate is acetyl triisopropyl titanate. Preferably, the residues comprise about 1 to about 20 ppm elemental titanium from tetraisopropyl titanate In preferred exemplary polyesters for each of the embodiments herein, the acid component of the polyester comprises repeat units from at least one aromatic, aliphatic, or alicyclic dicarboxylic acid, wherein the aromatic portion of said aromatic dicarboxylic acid has 6 to 20 carbon atoms and wherein the aliphatic or alicyclic portion of said aliphatic or alicyclic dicarboxylic acid has 3 to 20 carbon atoms. Examples of useful aliphatic dicarboxylic acids are malonic, succinic, glutaric, adipic, pimelic, suberic, azelaic, sebacic, dodecanedioic, 1,4-, 1,5-, and 2,6-decahydro-naphthalenedicarboxylic acid, and cis- or trans-1,4-cyclohexanedicarboxylic acid. Examples of useful aromatic dicarboxylic acids are terephthalic acid, isophthalic acid, 4,4'-biphenyldicarboxylic, trans 3,3'- and trans-4,4-stilbenedicarboxylic acid, 4,4'-dibenzyl-dicarboxylic acid, 1,4-, 1,5-, 2,3-, 2,6, and 2,7-naphthalenedicarboxylic acid. The corresponding esters, acid anhydrides, and acid chlorides of the acids are equivalent to the acid for use in the present invention. The preferred dicarboxylic acids are terephthalic and isophthalic acid or mixtures thereof.

The diol component of the polyester in the preferred exemplary polyesters for each of the embodiments comprises repeat units from at least one aliphatic, aliphatic ether, or cycloaliphatic diol having 2 to 20 carbon atoms, preferably 2 to 8 carbon atoms. Examples of useful diols are ethylene glycol, 1,2-propylene glycol, 1,3-propanediol, 1,4-butanediol, 1,5-pentanediol, 1,6-hexanediol, 1,2-, 1,3-, 1,4-cyclohexanedimethanol, neopentyl glycol, and 2,2,4,4-tetramethyl-1,3-cyclobutanediol. The preferred diols are 1,4-cyclohexanedimethanol, ethylene glycol, or mixtures thereof.

To produce a thermoplastic composition that is a miscible blend, the acid component comprises repeat units from about 80 to 100 mole percent terephthalic acid, isophthalic acid, naphthalenedicarboxylic acid, 1,4-cyclohexanedicarboxylic acid or mixtures thereof and from 0 to about 20 mole percent of other dicarboxylic acid units having from about 4 to about 40 carbon atoms. Exemplary of the other dicarboxylic acids suitable for use herein are sulfoisophthalic, sulfodibenzoic, succinic, glutaric, adipic, sebacic, suberic, dimer, dodecanedioic, and the like, or mixtures thereof. The diol component comprises repeat units from about 40 to 100 mole percent 1,4-cyclohexanedimethanol, from 0 to about 60 mole percent ethylene glycol, and from 0 to about 20 mole percent of other diol units having from 3 to about 12 carbon atoms. Exemplary of the other diols suitable for use herein are propylene glycol, 1,3-propanediol, 1,4-butanediol, 1,5-pentanediol, 1,6-hexanediol, neopentyl glycol, 2,2,4,4-tetramethyl-1,3-cyclobutanediol, diethylene glycol and the like, or mixtures thereof. The polyesters as described herein are based on an acid component of 100 mole percent and a diol component of 100 mole percent.

Preferred polyesters to produce the miscible blend comprise repeat units from terephthalic acid, isophthalic acid or mixtures thereof and 1,4-cyclohexanedimethanol, ethylene glycol or mixtures thereof.

Most preferably, the polyester used for the miscible blend comprises from about 95 to 100 mole percent of terephthalic acid, from about 58 to about 66 mole percent 1,4-cyclohexanedimethanol and from about 42 to about 34 mole percent of ethylene glycol. Another most preferred polyester comprises 100 mole percent 1,4-cyclohexanedimethanol, from about 22 to about 30 mole percent isophthalic acid, and from about 78 to about 70 mole percent terephthalic acid.

The 1,4-cyclohexanedimethanol and 1,4-cyclohexanedicarboxylic acid moieties used to prepare the polyesters can be trans, cis or trans/cis mixtures of isomers. Any of the naphthalenedicarboxylic acid isomers or mixtures of isomers can be used with the 1,4-, 1,5-, 2,6-, and 2,7-isomers being preferred.

Polyesters are typically produced in two steps. The first step involves direct esterification when reacting a diacid with a diol or ester exchange when reacting a dialkyl ester of a diacid with a diol. For esterification, an esterification catalyst is used. Preferably, titanium based catalyst compounds are used. When using a dialkyl ester, an ester exchange catalyst is used. Preferably, manganese or zinc based catalyst compounds are used in the ester exchange and are present from about 10 to about 65 ppm. After the first step, the desired product then undergoes polycondensation to the desired molecular weight, commonly measured as inherent viscosity (IV). During the manufacturing process of the polyester, a phosphorus-containing compound is typically added between step 1 and step 2 to control the activity of the esterification or ester exchange catalysts so that the catalysts from step 1 will not be involved during polycondensation. These phosphorus-containing compounds are referred herein as pre-polycondensation phosphorus as distinguished from post-polycondensation phosphorus discussed below.

Suitable pre-polycondensation phosphorus-containing compounds for use in preparing polyesters of the invention include, but are not limited to, phosphates, organic phosphate esters, organic phosphite esters, phosphoric acid, diphosphoric acid, polyphosphoric acid, phosphonic acid and substituted derivatives of all the above.

Special examples of phosphoric acid derivatives are the "PHM esters", that is, mixtures of oxalkylated alkyl hydroxyalkyl phosphoric esters of Formula I or phosphonic esters of Formula II:

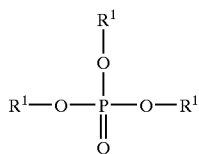

wherein the residues $R^1$ are identical or different alkyl, hydroxyalkyl, or alkoxylated hydroxyalkyl residues;

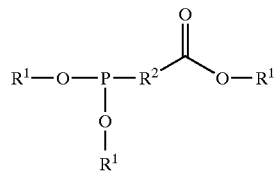

wherein $R^1$ are identical or different monovalent alkyl residues and $R^2$ is divalent alkyl residue.

Suitable phosphate esters for use as pre-polycondensation phosphorus-containing compounds in preparing the polyesters of the present invention include, but are not limited to, ethyl acid phosphate, diethyl acid phosphate, arylalkyl phosphates and trialkyl phosphates such as triethyl phosphate and tris-2-ethylhexyl phosphate. The preferred pre-polycondensation phosphorus-containing compound is a phosphate ester.

Preferably, the polyesters of each of the embodiments herein comprise toners to impart a desired neutral color to the resulting polyester. A preferred method of including colorants is to use a colorant having thermally stable organic colored compounds having reactive end groups such that the colorant is copolymerized and incorporated into the polyester to improve the hue of the polyester. For example, colorants such as dyes possessing reactive hydroxyl or carboxyl groups, including but not limited to, blue and red substituted anthraquinones may be copolymerized into the polymer chain. Suitable colorants and dyes are described in detail in U.S. Pat. Nos. 4,521,556; 4,740,581; 4,749,772; 4,749,773; 4,749,774; 4,950,732; 5,252,699; 5,384,377; 5,372,864; 5,340,910; and 5,681,918, herein incorporated by reference in their entirety. When dyes are used as colorants, they may be added during or after an ester exchange or esterification reaction. The total amount of dye is generally from about 1 to about 10 ppm. Small amounts of cobalt may also be used as a toner material. In such cases, the cobalt serves as both a toner as well as a polymer buildup catalyst.

In a more preferred embodiment, the polyester further comprises toner residues of from about 1 to about 10 ppm, preferably from about 1 to about 5 ppm, of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isquinoline-2,7-done) compound, wherein the compounds contain at least one polyester reactive group.

The inherent viscosity of the polyester of the present invention may range from about 0.3 to about 1.5 dl/g, the preferred range being about 0.6 to about 1.2 dl/g, at 25° C. in a solvent mixture consisting of 60% by weight phenol and 40% by weight tetrachloroethane determined in accordance with ASTM Test Method D2857-70.

The polyester may be prepared by conventional polycondensation procedures using either batch or continuous operations well-known in the art. Exemplary processes include direct condensation of the acid(s) with the diol(s) or by ester exchange using lower alkyl esters of the acids. For example, a dialkyl terephthalate such as dimethyl terephthalate is ester exchanged with the diol(s) at elevated temperatures in the presence of an ester exchange catalyst. One suitable method includes the step of reacting the acid(s) with the diol(s) at a temperature of about 100° C. to about 315° C. and at a pressure of about 0.1 to 760 mm (millimeter) mercury for a time sufficient to form a polyester. For particular methods of producing polyesters, reference is made to U.S. Pat. Nos. 2,901,466 and 3,772,405, the contents of which are incorporated herein by reference. The polyesters may also be subjected to solid-state polymerization methods for further molecular weight build-up.

Post-Polycondensation Phosphorus Addition

While the compounded polyester/polycarbonate blends of the present invention have reduced yellowness over similar conventional blends, minimal yellow coloration may still be present. For applications that require a more neutral color, the yellow coloration may be further suppressed by adding a blend stabilizer, typically a phosphorus-containing compound, to the blend.

This phosphorus-containing compound, which is added after polycondensation of the polyester either in the manufacture of the polyester or in compounding the polyester/polycarbonate blend, is distinguished from the phosphorus-containing compound added during formation of the polyester. Preferably, the thermoplastic compositions of this invention contain from about 0.01 to about 0.35 weight percent, preferably from about 0.05 to about 0.15 weight percent of a post-polycondensation phosphorus-containing compound. As shown in Example 5, the levels of post-polycondensation phosphorus-containing compound needed to achieve a more neutral color (b* equal to zero) for the blends of this invention are significantly lower than that typically required in equivalent blends of the prior art. Specifically, the conventional blend having a high level of titanium in the polyester requires 0.15 wt % of the same blend stabilizer to reach the same yellowness (b* around 1.3) of the equivalent blend of this invention having a low level of titanium, which only requires 0.05 wt % of the blend stabilizer.

Suitable post-polycondensation phosphorus-containing compound for use in polyester/polycarbonate blends of the invention include, but are not limited to the following;

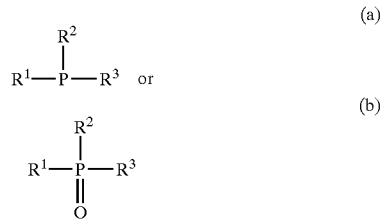

wherein each of $R^1$, $R^2$, and $R^3$ represents a hydrogen atom, an alkyl group containing 1 to 20 carbon atoms, an aryl group containing 6 to 20 carbon atoms, an arylalkyl group containing 7 to 20 carbon atoms, or an OR group in which R is a hydrogen atom, an alkyl group containing 1 to 20 carbon atoms, an aryl group containing 6 to 20 carbon atoms, and arylalkyl group containing 7 to 20 carbon atoms; $R^1$, $R^2$, and $R^3$ may be different from each other, or at least two of $R^1$, $R^2$, and $R^3$ may be the same, or at least two of $R^1$, $R^2$, and $R^3$ may form a ring, and metal salts of these phosphorous compounds;

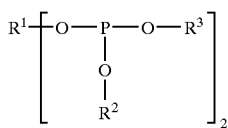

(c)

wherein R¹ represents a divalent alkyl group having 2–12 carbon atoms or a divalent aryl group having 6–15 carbon atoms; R² and R³ are monovalent alkyl groups having 2–18 carbon atoms, or a monovalent aryl or substituted aryl group having 6 to 15 carbons;

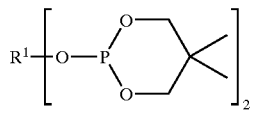

(d)

wherein R¹ represents a divalent alkyl or poly(alkylene oxide) groups having 2–12 carbon atoms or a divalent aryl or substituted aryl group having 6–15 carbon atoms; and

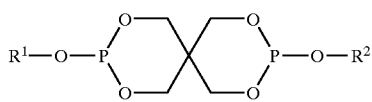

(e)

wherein $R^1$ and $R^2$ represent monovalent alkyl groups having 2–18 carbon atoms, or a monovalent aryl or substituted aryl groups having 6–15 carbon atoms. A preferred post-polycondensation phosphorus-containing compound of formula (e) is distearyl pentaerythritol diphosphite ($R^1$ and $R^2$ are $C_{18}H_{37}$).

These stabilizers may be used alone or in combination. These stabilizers maybe added to the polycarbonate or polyester prior to forming a polyester/polycarbonate mixture, during the process of forming the polyester/polycarbonate mixture, during the compounding of the polyester/polycarbonate mixture to make a polyester/polycarbonate blend. The suitability of a particular compound for use as a stabilizer and the determination of how much is to be used as a stabilizer may be readily determined by preparing a mixture of the polyester component, the polycarbonate with and without the particular compound and determining the effect on melt viscosity or color stability.

Polycarbonate

Any polycarbonate can be used in the present invention. Preferred polycarbonates are aromatic polycarbonates that as are obtained by reacting dihydric phenol with a carbonate precursor such as phosgene or diphenyl carbonate.

The dihydric phenols employed are known, and the reactive groups are thought to be the phenolic hydroxyl groups. Typical of some of the dihydric phenols employed are bis-phenols such as 2,2-bis-(4-hydroxyphenyl)-propane (bisphenol A), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane,.alpha.,.alpha.'-bis-(4-hydroxyphenyl)-p-diisopropylbenzene, 2,2-bis-(3-methyl4-hydroxyphenyl)-propane, 2,2-bis-(3-chloro-4-hydroxyphenyl)propane, bis-(3,5-dimethyl4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy benzophenone, 2,4-bis-(3,5-dimethyl-4-hydroxyphenyl)-cyclohexane, .alpha., .alpha.'-bis-(3,5-dimethyl-4-hydroxyphenyl)-p-diisopropylbenzene and 4,4'-sulfonyl diphenol. Other dihydric phenols might include hydroquinone, resorcinol, bis-(hydroxyphenyl)-alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydroxyphenyl)-sulfones, and .alpha.,.alpha.-bis-(hydroxyphenyl)diisopropylbenzenes, as well as their nuclear-alkylated compounds. These and further suitable dihydric phenols are described, for example, in U.S. Pat. Nos. 2,991,273; 2,999,835; 2,999,846; 3,028,365; 3,148,172; 3,153,008; 3,271,367; 4,982,014; 5,010,162 all incorporated herein by reference. The polycarbonates of the invention may entail in their structure, units derived from one or more of the suitable bisphenols. The most preferred dihydric phenol is 2,2-bis-(4-hydroxyphenyl)-propane (bisphenol A).

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The polycarbonates may be prepared by a variety of conventional and well known processes which include transesterification, melt polymerization, and interfacial polymerization. The polycarbonates are generally prepared by reacting a dihydric phenol with a carbonate precursor, such as phosgene, a haloformate or carbonate ester in melt or solution. Suitable processes for preparing the polycarbonates of the present invention are described in U.S. Pat. Nos., 2,991,273; 2,999,846; 3,028,365; 3,153,008; 4,123,436; all of which are incorporated herein by reference.

The polycarbonates of this invention have a weight average molecular weight, as determined by gel permeation chromotatography, of about 10,000 to 200,000, preferably 10,000 to 80,000 and their melt flow index, per ASTM D-1238 at 300° C. is about 1 to 100 g/10 min, preferably about 2 to 80 g/10 min. The polycarbonates may be branched or unbranched. It is contemplated that the polycarbonates may have various known end groups. The polycarbonates suitable for use in the present invention are well known and are generally commercially available.

Blends

The blends may comprise more than one polyester and more than one polycarbonate and can be prepared by conventional processing techniques known in the art, such as melt blending or solution blending.

Blends can be prepared by making pellet mixtures that are melt blended on either a single or twin screw extruder to form a homogenous blend, then extruded and pelletized. These melt blended pellets may then be re-melted and extruded to form film, sheeting, or profiles or injection molded to form shaped articles. Alternatively, pellets of the polyester and polycarbonate may be fed separately and the melts mixed prior to the extrusion or injection molding operation. The melt blending method includes blending the polymers at a temperature sufficient to melt the polyester and polycarbonate portions, and thereafter cooling the blend to a temperature sufficient to produce a useful object. The term "melt" as used herein includes, but is not limited to, merely softening the polymers. For melt mixing methods generally known in the polymers art, see Mixing and Compounding of Polymers (I. Manas-Zloczower & Z. Tadmor eds, Carl Hanser Verlag publisher, New York 1994).

The solution blending method includes dissolving the appropriate weight/weight ratio of polyester and polycarbonate in a suitable organic solvent such as methylene chloride, mixing the solution, and separating the blend composition from solution by precipitation of the blend or by evaporation of the solvent. Solution-prepared blending methods are generally known in the art.

The polyester/polycarbonate blends of this invention may be miscible or immiscible. Blend miscibility is dependent on the chemical nature of the polyester and the chemical nature of the polycarbonate involved in blending. For instance, in polyesters comprised of diacid or chemical equivalent residues of terephthalic and/or isophthalic acid, and diol residues of ethylene glycol and/or 1,4-cyclohexanedimethanol, miscibility with bisphenol A polycarbonate is dependent on the molar ratio of the diol residues of the polyester. As shown in Research Disclosure 22921, miscibility with bisphenol A polycarbonate generally occurs for polyesters in which at least 40 mol % of the diol component is 1,4-cyclohexanedimethanol. As discussed by Mohn et. al, the effect of changing the diacid or chemical equivalent residues from terephthalic acid to isophthalic acid has very little effect on polyester miscibility with bisphenol A polycarbonate [J. Appl. Polym. Sci., 23, 575 (1979)].

In addition, the thermoplastic compositions of this invention may contain common additives such as colorants, mold release agents, flame retardants, plasticizers, nucleating agents, UV stabilizers, fillers, and impact modifiers. The impact modifiers may be added to the subject compositions in conventional amounts of from 0.1 to 25% by weight of the overall composition. Examples of typical commercially available impact modifiers well known in the art and useful in this invention include, but are not limited to, ethylene/propylene terpolymers, styrene based block copolymeric impact modifiers, and various acrylic core/shell type impact modifiers.

Reinforcing materials are also useful in the molding compositions of this invention. The reinforcing materials may include carbon filaments, silicates, mica, clay, talc, titanium dioxide, Wollastonite, glass flakes, glass beads and fibers, and polymeric fibers and combinations thereof. The preferred reinforcing materials are of glass, and it is further preferred to use fibrous glass filaments, mixtures of glass and talc, glass and mica, and glass and polymeric fibers.

The compositions of this invention may be fabricated into films or sheets by any technique known in the art. For example, films may be produced by the well known cast film, blown film and extrusion coating techniques, the latter including extrusion onto a substrate. Films produced by melt casting or blowing can be thermally bonded or sealed to a substrate using an adhesive. The ordinary artisan, in possession of the present disclosure, can prepare such films and articles containing such films without undue experimentation.

Additionally, the present invention is directed to articles of manufacture formed from the blend compositions and films and sheets of the present invention. The articles can be produced utilizing any suitable technique such as injection molding. Extruded objects comprising the blends have a wide range of commercial uses. For example, films and sheets are useful for signs, skylights, the packaging of foods, clothing, and pharmaceutical products. Extruded films/sheets may be used as is or thermoformed to provide packaging for foods, hardware and other items. The polyester/polycarbonate blends of this invention may be foamed during the extrusion operations using techniques well known in the art. For example, useful foaming techniques are disclosed in U.S. Pat. Nos. 5,399,595; 5,482,977; and 5,654,347.

Other Embodiments

In an embodiment of the present invention, a miscible blend comprises:

(a) about 1 to about 99 weight percent of a polyester comprising:

(i) an acid component comprising repeat units from about 80 to 100 mole percent terephthalic acid, isophthalic acid, naphthalenedicarboxylic acid, 1,4-cyclohexanedicarboxylic acid or mixtures thereof and from 0 to about 20 mole percent of other dicarboxylic acid units having from about 4 to about 40 carbon atoms, wherein the total mole percent of the acid component is equal to 100 mole percent, and (ii) a diol component comprising repeat units from about 40 to 100 mole percent 1,4-cyclohexanedimethanol, from 0 to about 60 mole percent ethylene glycol, and from 0 to about 20 mole percent of other diol units having from 3 to about 12 carbon atoms, wherein the total mole percent of diol component is equal to 100 mole percent; and (b) about 99 to about 1 weight percent of a polycarbonate of 4,4-isopropylidenediphenol;

wherein an improvement comprises the polyester comprising catalyst residues of (i) a titanium-containing catalyst compound in an amount of from about 1 to about 20 ppm elemental titanium, (ii) a pre-polycondensation phosphorus-containing compound in an amount of from about 1 to about 150 ppm elemental phosphorus, (iii) from about 1 to about 10 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isquinoline-2,7-done) compound, wherein the compounds contain at least one polyester reactive group; and (iv) optionally, a ester exchange catalyst in an amount of from about 1 to about 150 ppm of an active element utilized when the acid component is derived from a diester of the dicarboxylic acid, with ppm based on the total weight of the polyester.

One embodiment of the present invention is a process for preparing a blend of a polyester and a polycarbonate. In one step, the polyester is produced comprising the steps of:

(i) reacting 100 mole percent of a diacid, or ester derivative thereof, of at least one aromatic, aliphatic, or alicyclic dicarboxylic acid, wherein the aromatic portion of said aromatic dicarboxylic acid has 6 to 20 carbon atoms and wherein the aliphatic or alicyclic portion of said aliphatic or alicyclic dicarboxylic acid has 3 to 20 carbon atoms, and 100 mole percent of a diol comprising at least one aliphatic, aliphatic ether, or cycloaliphatic diol having 2 to 20 carbon atoms at a temperature and pressure sufficient to effect esterification for the diacid or ester exchange for the ester derivative; and ii) polycondensing the product of step (i) at temperatures and pressures sufficient to effect polycondensation in the presence of a titanium-containing catalyst compound in an amount of from about 1 to about 20 ppm elemental titanium and a pre-polycondensation phosphorus-containing compound in an amount of from about 1 to about 150 ppm elemental phosphorus, with ppm based on the total weight of the polyester.

After producing the polyester, from about 1 to about 99 weight percent of the polyester is compounded with from about 99 to about 1 weight percent of a polycarbonate to form a blend, with the weight percent based on the total weight percent of the blend.

In another embodiment, a process for preparing a thermoplastic composition comprises the step of compounding:
(a) from about 1 to about 99 weight percent of a polyester comprising:
  (i) 100 mole percent of an acid component comprising repeat units from at least one aromatic, aliphatic, or alicyclic dicarboxylic acid, wherein the aromatic portion of said aromatic dicarboxylic acid has 6–20 carbon atoms and wherein the aliphatic or alicyclic portion of said aliphatic or alicyclic dicarboxylic acid has 3–20 carbon atoms, and
  (ii) 100 mole percent of a diol component comprising repeat units from at least one aliphatic, aliphatic ether, or cycloaliphatic diol having 2–20 carbon atoms,
  (iii) residues of a titanium-containing catalyst compound in an amount of from about 1 to about 20 ppm elemental titanium, a pre-polycondensation phosphorus-containing compound in an amount of from about 1 to about 100 ppm elemental phosphorus, and optionally, an ester exchange catalyst in an amount of from about 1 to about 150 ppm of an active element utilized when the acid component is derived from a diester of the dicarboxylic acid, with ppm based on the total weight of the polyester. and
(b) from about 99 to about 1 weight percent of a polycarbonate.

In still another embodiment of the present invention, a polyester composition has an inherent viscosity of from about 0.6 to about 1.2 dl/g measured at 25° C. in a solvent mixture consisting of 60% by weight phenol and 40% by weight tetrachloroethane and the polyester comprises
(a) an acid component comprising repeat units from terephthalic acid, isophthalic acid, and mixtures thereof;
(b) a diol component comprising repeat units from about 40 to 100 mole percent 1,4-cyclohexanedimethanol and about 0 to about 60 mole percent ethylene glycol; and
(c) catalyst residues consisting essentially of (i) a titanium-containing catalyst compound in an amount of about 1 to about 15 ppm elemental titanium, (ii) a pre-polycondensation phosphorus-containing compound in an amount of about 45 to about 100 ppm elemental phosphorus, (iii) from about 1 to about 5 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isquinoline-2,7-done) compound, wherein the compounds contain at least one polyester reactive group, and (iv) optionally, an ester exchange catalyst in an amount of from about 10 to about 65 ppm of an active element utilized when the acid component is derived from a diester of the dicarboxylic acid;
wherein the acid component is based on 100 mole percent and the diol component is based on 100 mole percent and ppm are based on the total weight of the polyester. Preferably, the polyester comprises from about 95 to 100 mole percent of terephthalic acid, from about 58 to about 66 mole percent 1,4-cyclohexanedimethanol and from about 42 to about 34 mole percent of ethylene glycol. Also preferably, the polyester comprises 100 mole percent 1,4-cyclohexanedimethanol, from about 22 to about 30 mole percent isophthalic acid, and from about 78 to about 70 mole percent terephthalic acid.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

EXAMPLES

Polyesters were prepared from terephthalic acid with various mole percentages of 1,4-cyclohexanedimethanol (CHDM) and ethylene glycol (EG). For a given polyester composition, two nearly identical inherent viscosity (IV) polyesters, as measured at 25° C. in a solvent consisting of 60% by weight phenol and 40% by weight tetrachlorethane, were produced with different levels of a titanium based catalyst. The titanium levels and pre-polycondensation phosphorous levels in the prepared polyesters were verified by measuring the titanium level with X-ray analysis. A description of the polyesters as prepared are shown in the following table.

TABLE 1

| Polyester # | Mol % CHDM | Mol % EG | ppm Ti | ppm P | IV (dl/g) |
|---|---|---|---|---|---|
| 1 | 30 | 70 | 54 | 70 | 0.75 |
| 2 | 30 | 70 | 16 | 77 | 0.74 |
| 3 | 60 | 40 | 51 | 85 | 0.72 |
| 4 | 60 | 40 | 12 | 70 | 0.73 |

Example 1

The following thermoplastic compositions illustrate reduced yellowness in polyester #2/polycarbonate blends compared to polyester #1/polycarbonate blends.

Bisphenol A polycarbonate with a melt flow index of 5 g/10 min, Calibre 302.5 from Dow Chemical Company, was dried at 125° C. for 10 hours prior to blending. Polyesters #1 and #2 were dried at 65° C. for 10 hours prior to blending. Blend compositions were prepared by blending with a Sterling 1.25" single screw extruder at 280° C. with a screw speed of 80 rpm. Neat materials were also extruded in order to give the neat materials a similar thermal history. The resulting pellet compositions were then dried at 65° C. for 16 hours. 4"×4" plaques of ⅛" thickness were injection molded from the pellets with a Toyo Plastar Ti-90G injection molding machine at melt temperatures of 300° C. and 325° C. The mold temperature was 30° C. and the injection molding process cycle time from injection to cooling was 30 seconds.

The glass transition temperatures (Tg's) of the pellets were determined using a TA Instruments 2920 differential scanning calorimeter (DSC) at a scan rate of 20° C./min. The color of the polymer pellets and plaques was determined in a conventional manner using a HunterLab UltraScan Colorimeter manufactured by Hunter Associates Laboratory, Inc., Reston, Va. The instrument was operated using HunterLab Universal Software (version 3.8). Calibration and operation of the instrument was done according to the HunterLab User Manual. To reproduce the results on any colorimeter, run the instrument according to its instructions and use the following testing parameters: D65 Light Source (daylight, 6500° K color temperature), Reflectance Mode, Large Area View, Specular Included, CIE 10° Observer, Outputs are CIE L*, a*, b*. The pellets were placed in a holder that is 25 mm deep by 55 mm wide and high. The holder is black with a window on one side. During testing, the clear side of the holder was held at the reflectance port of the colorimeter as is normally done when testing in reflectance mode. The plaques were tested by holding the plaques with a standard white background tile to the reflectance port of the colorimeter as is normally done when testing in reflectance mode.

The blends in Example 1 are immiscible as evidenced by the presence of two glass transition temperatures; one associated with polyester and the other associated with the polycarbonate. Polyester type did not significantly influence Tg(s) of the compositions evaluated. In addition, the blends in Example 1 are opaque due to differences in the index of refraction between the polyester and the polycarbonate. At equivalent polycarbonate loadings, the pellet b*s of polyester #2/polycarbonate blends are lower than the pellet b*'s of polyester #1/polycarbonate blends. At equivalent polycarbonate loadings, the plaque b*s of polyester #2/polycarbonate blends are lower than the plaque b*'s of polyester #1/polycarbonate blends at both molding temperatures. In addition, at equivalent polycarbonate loadings polyester #2/polycarbonate blends have better thermal stability, with regards to color formation as represented by lower Δb* values, than polyester #1/polycarbonate blends. The reduced yellowness seen in the blends is significantly larger than the reduced yellowness seen in neat polyesters (composition A).

Bisphenol A polycarbonate with a melt flow index of 5 g/10 min, Calibre 302.5 from Dow Chemical Company, was dried at 125° C. for 10 hours prior to blending. Polyesters #3 and #4 were dried at 65° C. for 10 hours prior to blending. Blend compositions were prepared by blending with a Sterling 1.25" single screw extruder at 280° C. with a screw speed of 80 rpm. Neat materials were also extruded in order to give the neat materials a similar thermal history. The resulting pellet compositions were then dried at 65° C. for 16 hours. 4"×4" plaques of ⅛" thickness were injection molded from the pellets with a Toyo Plastar Ti-90G injection molding machine at melt temperatures of 300° C. and 325° C. The mold temperature was 30° C. and the injection molding process cycle time from injection to cooling was 30 seconds.

The blends in Example 2 are miscible as evidence by the presence of one glass transition temperature. Polyester type did not significantly influence Tg of the compositions evaluated In addition, the blends in Example 2 are clear since the propensity of the polycarbonate or the polyester to crystallize is low. At equivalent polycarbonate loadings, the pellet b*s of polyester #4/polycarbonate blends are lower than the pellet b*'s of polyester #3/polycarbonate blends. At equivalent polycarbonate loadings, the plaque b*s of polyester #4/polycarbonate blends are lower than the plaque b*'s of polyester #3/polycarbonate blends at both molding temperatures. In addition, at equivalent polycarbonate loadings

TABLE 2

| Ex. 1 | Wt % PC in Blend | Tg (° C.) Poly #1 | Tg (° C.) Poly #2 | b* Pellets Poly #1 | b* Pellets Poly #2 | b* ⅛" Plaq 300° C. MT Poly #1 | b* ⅛" Plaq 300° C. MT Poly #2 | b* ⅛" Plaq 325° C. MT Poly #1 | b* ⅛" Plaq 325° C. MT Poly #2 | Δb* of MT Poly #1 | Δb* of MT Poly #2 |
|---|---|---|---|---|---|---|---|---|---|---|---|
| A | 0 | 81 | 82 | 2.1 | −1.0 | 2.7 | 0.7 | 5.4 | 1.7 | 2.7 | 1.0 |
| B | 20 | 84/137 | 84/140 | 7.7 | 3.3 | 21.8 | 7.3 | 67.9 | 28.7 | 46.1 | 21.4 |
| C | 40 | 85/137 | 84/139 | 8.2 | 3.4 | 14.4 | 7.6 | 56.4 | 15.6 | 42.0 | 8.0 |
| D | 60 | 84/141 | 84/141 | 8.0 | 4.2 | 14.4 | 6.1 | 45.7 | 8.7 | 31.3 | 2.6 |
| E | 80 | 83/142 | 83/143 | 6.3 | 2.7 | 10.2 | 5.5 | 17.3 | 7.0 | 7.1 | 1.5 |

"PC" is polycarbonate, "Poly" is polyester, "Plaq" is plaque, and "MT" is molding melt temperature.

Example 2

The following thermoplastic compositions illustrate reduced yellowness in polyester #4/polycarbonate blends compared to polyester #3/polycarbonate blends.

polyester #4/polycarbonate blends have better thermal stability as represented by lower Δb* values, with regards to color formation, than polyester #3/polycarbonate blends. The reduced yellowness seen in the blends is significantly larger than the reduced yellowness seen in neat polyesters (composition A).

TABLE 3

| Ex. 2 | Wt % PC in Blend | Tg (° C.) Poly #3 | Tg (° C.) Poly #4 | b* Pellets Poly #3 | b* Pellets Poly #4 | b* ⅛" Plaq 300° C. MT Poly #3 | b* ⅛" Plaq 300° C. MT Poly #4 | b* ⅛" Plaq 325° C. MT Poly #3 | b* ⅛" Plaq 325° C. MT Poly #4 | Δb* of MT Poly #3 | Δb* of MT Poly #4 |
|---|---|---|---|---|---|---|---|---|---|---|---|
| A | 0 | 85 | 85 | 0.0 | −0.2 | 0.5 | 0.5 | 1.5 | 0.6 | 1.0 | 0.1 |
| B | 20 | 95 | 96 | 8.6 | 4.2 | 24.9 | 6.2 | 69.4 | 7.5 | 44.5 | 1.3 |
| C | 40 | 105 | 107 | 11.7 | 5.7 | 32.3 | 9.3 | 66.3 | 8.9 | 34.0 | −0.4 |
| D | 60 | 119 | 120 | 13.3 | 5.0 | 28.2 | 6.0 | 56.1 | 6.3 | 27.9 | 0.3 |
| E | 80 | 133 | 134 | 11.6 | 3.3 | 16.2 | 4.0 | 22.0 | 3.9 | 5.8 | −0.1 |

"PC is polycarbonate, "Poly" is polyester, "Plaq" is plaque, and "MT" is molding melt temperature.

Example 3

The following thermoplastic compositions illustrate thermal stability improvements in polyester #4/polycarbonate blends compared to polyester #3/polycarbonate blends.

Bisphenol A polycarbonate with a melt flow index of 5 g/10 min, Calibre 302.5 from Dow Chemical Company, was dried at 125° C. for 10 hours prior to blending. Polyesters #3 and #4 were dried at 65° C. for 10 hours prior to blending. Blend compositions were prepared by blending with a Sterling 1.25" single screw extruder at 280° C. with a screw speed of 80 rpm. Neat materials were also extruded in order to give the neat materials a similar thermal history. The resulting pellet compositions were then dried at 65° C. for 24 hours in a vacuum oven. For each composition, a 11 to 14 mg sample was placed in a TA Instruments 2950 Thermogravimetric Analyzer (TGA) at 280° C. for 20 minutes and the percent weight loss was recorded. Lower percent weight loss signifies improved thermal stability.

At equivalent polycarbonate loadings, the thermal stability of polyester #4/polycarbonate blends is improved over polyester #3/polycarbonate blends. The thermal stability improvements in blends, especially at low polycarbonate loadings (compositions B, C, D), are larger than the thermal stability improvements in the neat polyesters. The improvements are not as noticeable at high polycarbonate loadings (composition E), due to a large amount of polycarbonate.

| Ex. 3 | Wt % PC in Blend | Wt Loss (%) After 20 Min at 280° C. Polyester #3 | Wt Loss (%) After 20 Min at 280° C. Polyester #4 |
|---|---|---|---|
| A | 0 | 0.39 | 0.36 |
| B | 20 | 0.72 | 0.45 |
| C | 40 | 0.55 | 0.41 |
| D | 60 | 0.38 | 0.30 |
| E | 80 | 0.29 | 0.28 |

Example 4

The following thermoplastic compositions illustrate melt stability improvements in polyester #4/polycarbonate blends compared to polyester #3/polycarbonate blends.

Bisphenol A polycarbonate with a melt flow index of 5 g/10 min, Calibre 302.5 from Dow Chemical Company, was dried at 125° C. for 10 hours prior to blending. Polyesters #3 and #4 were dried at 65° C. for 10 hours prior to blending. Blend compositions were prepared by blending with a Sterling 1.25" single screw extruder at 280° C. with a screw speed of 80 rpm. Neat materials were also extruded in order to give the neat materials a similar thermal history. The resulting pellet compositions were then dried at 65° C. for 24 hours in a vacuum oven. Pellets were then placed in a 25 mm parallel plate Ares rheometer, manufactured by Rheometrics. The viscosity was measured as a function of time for 30 minutes in air with a gap setting of 1 mm, a strain level of 0.10, and testing frequency of 25 rad/sec.

The initial viscosity and final viscosity after 30 minutes for the prepared compositions are shown in the table below. The percent viscosity change is equal to the viscosity change normalized by the initial viscosity. Lower percent viscosity changes signifies improved melt stability. At equivalent polycarbonate loadings, the melt stability of polyester #4/polycarbonate blends is improved over polyester #3/polycarbonate blends. The melt stability improvements in the blends are larger than the melt stability improvements in the neat polyesters, which are negligible.

TABLE 4

| Ex. 4 | Wt % PC in Blend | $\eta_o$ at 280° C., 25 Hz (Poise) Poly #3 | $\eta_o$ at 280° C., 25 Hz (Poise) Poly #4 | $\eta_f$ at 280° C., 25 Hz (Poise) Poly #3 | $\eta_f$ at 280° C., 25 Hz (Poise) Poly #4 | Δ % η Poly #3 | Δ % η Poly #4 |
|---|---|---|---|---|---|---|---|
| A | 0 | 2986 | 3760 | 1749 | 2248 | 41 | 40 |
| B | 20 | 5726 | 6241 | 540 | 2534 | 91 | 59 |
| C | 40 | 6997 | 7284 | 1195 | 4220 | 83 | 42 |
| D | 60 | 11878 | 9061 | 3158 | 6052 | 73 | 33 |
| E | 80 | 11598 | 12107 | 9271 | 11773 | 20 | 3 |

"PC" is polycarbonate, "$\eta_o$" is initial viscosity, "Poly" is polyester, "$\eta_f$" is final viscosity, "Δ % η" is change in percent viscosity

Example 5

The following thermoplastic compositions illustrate that lower level of stabilization are needed to achieve further color reductions, if needed, in polyester #2/polycarbonate blends compared to polyester #1/polycarbonate blends and polyester #4/polycarbonate blends compared to polyester #3/polycarbonate blends.

Bisphenol A polycarbonate with a melt flow index of 5 g/10 min, Calibre 302.5 from Dow Chemical Company, was dried at 125° C. for 10 hours prior to blending. Polyesters #1, #2, #3 and #4 were dried at 65° C. for 10 hours prior to blending. A 5 wt % Weston 619 concentrate was made by compounding Weston 619 into polycarbonate on a twin screw extruder. Weston 619 is a distearyl pentaerythritol diphosphite manufactured by GE specialty chemicals. Weston 619 is known to be an effective stabilizer in polyester/polycarbonate blend. This concentrate was used to effectively add Weston 619 in pellet/pellet blends. 50/50 weight percent polyester/polycarbonate blends with different levels of Weston 619 were bag blended and then injection molded into 100 mil thick color chips with a Toyo Plastar Ti-90G injection molding machine equipped with a mixing screw and mixing nozzle to provide homogeneity. A melt temperature of 280° C., a mold temperature of 40° C., with a cycle time of 30 seconds from injection to cooling.

The color chip b* values for various loadings of blend stabilizer, parts per hundred resin (phr), in a 50/50 by weight blend of polyester/polycarbonate are shown in the table below. As the data reveals, a low b* can be achieved with lower levels of stabilization, phr blend stabilizer, in polyester #2/polycarbonate blends compared to polyester #1/polycarbonate blends. As the data reveals, a low b* can be achieved with lower levels of stabilization, phr blend stabilizer, in polyester #4/polycarbonate blends compared to polyester #3/polycarbonate blends.

TABLE 5

| Ex. 5 | Phr Blend Stabilizer | b* Blend with Poly #1 | b* Blend with Poly #2 | b* Blend with Poly #3 | b* Blend with Poly #4 |
|---|---|---|---|---|---|
| A | 0 | 12.3 | 5.1 | 14.3 | 3.6 |
| B | 0.05 | 7.9 | 5.4 | 4.9 | 1.4 |
| C | 0.10 | 4.5 | 1.6 | 2.8 | 0.8 |
| D | 0.15 | 2.8 | 1.0 | 1.2 | 0.6 |

The invention has been described in detail with particular reference to preferred embodiments thereof, but it will be understood that variations and modifications can be affected with the spirit and scope of the invention.

What is claimed is:

1. In a thermoplastic composition comprising a miscible blend of:
   (a) about 1 to about 99 weight percent of a polyester comprising:
      (i) an acid component comprising repeat units from about 80 to 100 mole percent terephthalic acid, isophthalic acid, naphthalenedicarboxylic acid, 1,4-cyclohexanedicarboxylic acid or mixtures thereof and from 0 to about 20 mole percent of other dicarboxylic acid units having from about 4 to about 40 carbon atoms, wherein the total mole percent of the acid component is equal to 100 mole percent, and
      (ii) a diol component comprising repeat units from about 40 to 100 mole percent 1,4-cyclohexanedimethanol, from 0 to about 60 mole percent ethylene glycol, and from 0 to about 20 mole percent of other diol units having from 3 to about 12 carbon atoms, wherein the total mole percent of diol component is equal to 100 mole percent; and
   (b) about 99 to about 1 weight percent of a polycarbonate of 4,4-isopropylidenediphenol;
   the improvement comprising the polyester comprising (i) catalyst residues of a titanium-containing catalyst compound in an amount of from about 1 to about 20 ppm elemental titanium, (ii) catalyst residues of a pre-polycondensation phosphorus-containing compound in an amount of from about 1 to about 150 ppm elemental phosphorus, (iii) from about 1 to about 10 ppm of at least one copolymerizable compound of a 6-arylamino-1-cyano-3H-dibenz[f,ij]isoquinoline-2,7-dione or a 1,4-bis(2,6-dialkylanilino)anthraquinone in combination with at least one bis anthraquinone or bis anthrapyridone(6-arylamino-3H-dibenz[f,ij]isquinoline-2,7-done) compound, wherein the compounds contain at least one polyester reactive group; (iv) from about from 0.01 to about 0.35 weight percent, based on the total weight of the blend, of distearyl pentaerythritol diphosphite as a post-polycondensation phosphorus-containing compound; and (v) optionally, an ester exchange catalyst in an amount of from about 1 to about 150 ppm of an active element utilized when the acid component is derived from a diester of the dicarboxylic acid, with ppm based on the total weight of the polyester.

2. The thermoplastic composition of claim 1 wherein the polyester comprises from about 95 to 100 mole percent of terephthalic acid, from about 58 to about 66 mole percent 1,4-cyclohexanedimethanol and from about 42 to about 34 mole percent of ethylene glycol.

3. The thermoplastic composition of claim 1 wherein the polyester comprises 100 mole percent 1,4-cyclohexanedimethanol, from about 22 to about 30 mole percent isophthalic acid, and from about 78 to about 70 mole percent terephthalic acid.

4. The thermoplastic composition of claim 1 wherein the titanium-containing catalyst compound is present in an amount of from about 1 to about 15 ppm elemental titanium.

5. A molded article formed from the thermoplastic composition of claim 1.

6. A film or sheet formed from the thermoplastic composition of claim 1.

* * * * *